United States Patent
Sato et al.

(10) Patent No.: US 8,218,340 B2
(45) Date of Patent: Jul. 10, 2012

(54) SWITCHING POWER SUPPLY APPARATUS AND PRIMARY SIDE CONTROL CIRCUIT

(75) Inventors: Takeshi Sato, Tama (JP); Takumi Hyuugaji, Tama (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 399 days.

(21) Appl. No.: 12/664,017

(22) PCT Filed: Jun. 11, 2008

(86) PCT No.: PCT/JP2008/060644
§ 371 (c)(1),
(2), (4) Date: Dec. 10, 2009

(87) PCT Pub. No.: WO2008/153037
PCT Pub. Date: Dec. 18, 2008

(65) Prior Publication Data
US 2010/0172158 A1 Jul. 8, 2010

(30) Foreign Application Priority Data
Jun. 14, 2007 (JP) .................................. 2007-157071

(51) Int. Cl.
*H02M 3/335* (2006.01)
(52) U.S. Cl. ..................... 363/21.13; 363/97; 323/303
(58) Field of Classification Search .............. 363/16–17, 363/20, 21.07, 21.13, 21.14, 21.15, 21.16, 363/95–98, 131; 323/222, 224, 262, 265, 323/266, 267, 271, 282, 299, 303
See application file for complete search history.

(56) References Cited

U.S. PATENT DOCUMENTS

| | | | | |
|---|---|---|---|---|
| 5,570,276 A | * | 10/1996 | Cuk et al. | 363/16 |
| 5,719,755 A | * | 2/1998 | Usui | 363/19 |
| 5,764,495 A | * | 6/1998 | Faulk | 363/21.13 |
| 5,774,350 A | * | 6/1998 | Notaro et al. | 363/89 |

(Continued)

FOREIGN PATENT DOCUMENTS

CN 1938924 A 3/2007
(Continued)

OTHER PUBLICATIONS

English Language International Search Report dated September 9, 2008 issued in parent Appln. No. PCT/JP2008/060644.

(Continued)

*Primary Examiner* — Rajnikant Patel
(74) *Attorney, Agent, or Firm* — Holtz, Holtz, Goodman & Chick, PC

(57) ABSTRACT

A synchronous rectification type DC-DC converter equipped with a burst mode prevents backward flows of currents on the secondary side thereof. The DC-DC converter turns off a control signal of a switching element on the primary side when the load thereof becomes light, and includes a voltage converting transformer, a first switching element connected to the primary side coil of the transformer, a primary side control circuit performing on-off control of the first switching element, a synchronously rectifying second switching element connected to the secondary side coil, and a secondary side control circuit performing on-off control of the second switching element. A pulse width ensuring circuit ensures that the pulse width of the control signal performing on-off control of the first switching element does not become equal to or less than the original width of a PWM pulse when entering the burst mode and when exiting the burst mode.

8 Claims, 4 Drawing Sheets

U.S. PATENT DOCUMENTS

| | | | |
|---|---|---|---|
| 6,038,150 A * | 3/2000 | Yee et al. | 363/89 |
| 7,120,036 B2 | 10/2006 | Kyono | |
| 2002/0135342 A1 | 9/2002 | Tomioka | |

FOREIGN PATENT DOCUMENTS

| | | |
|---|---|---|
| JP | 2002-233146 A | 8/2002 |
| JP | 2002-281750 A | 9/2002 |
| WO | WO 2005/034324 A1 | 4/2005 |
| WO | WO 2005/101624 A1 | 10/2005 |

OTHER PUBLICATIONS

Chinese Office Action dated Oct. 19, 2011 issued in counterpart Chinese Application No. 200880013777.4.

* cited by examiner

FIG.6
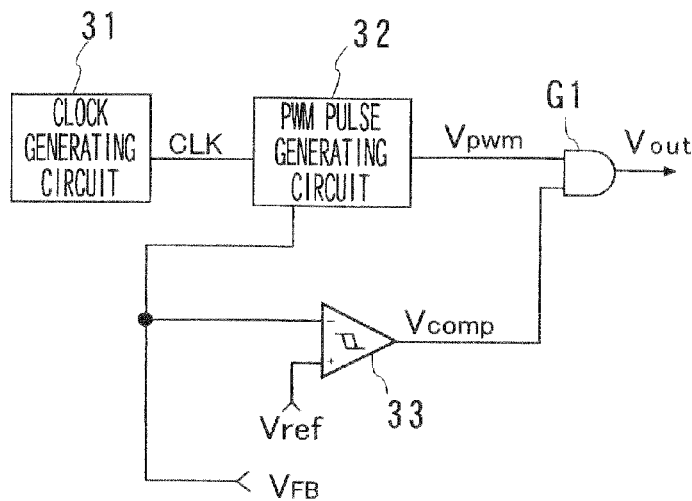
FIG.7A  Vpwm
FIG.7B  Vcomp
FIG.7C  Vout G1 OUTPUT
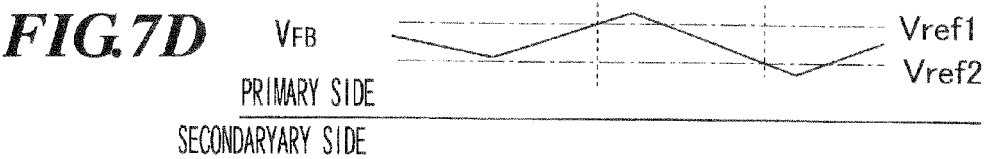
FIG.7D  VFB
PRIMARY SIDE
───────────────
SECONDARYARY SIDE
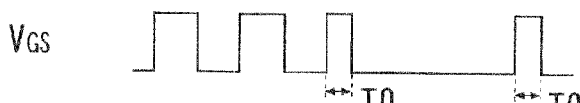
FIG.7E  VGS
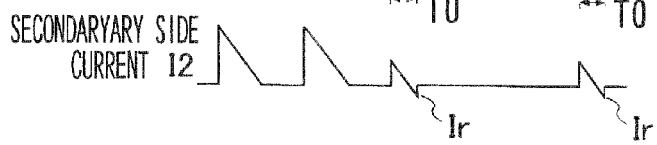
FIG.7F  SECONDARYARY SIDE CURRENT I2

SWITCHING POWER SUPPLY APPARATUS AND PRIMARY SIDE CONTROL CIRCUIT

This application is a U.S. National Phase Application under 35 USC 371 of International Application PCT/JP2008/060644 filed Jun. 11, 2008.

TECHNICAL FIELD

The present invention relates to a switching power supply apparatus generating a direct-current power supply voltage and further relates to an insulated type DC-DC converter using a transformer. The present invention more particularly relates to a technique effective in being applied to a synchronous rectification type DC-DC converter performing rectification on the secondary side circuit thereof by the synchronous rectification control thereof.

BACKGROUND ART

There is an insulated type DC-DC converter as a circuit converting an input direct-current voltage to output a direct-current voltage having potential different from that of the input direct-current voltage by the use of a transformer. Moreover, the insulated type DC-DC converter includes one using a diode for rectifying a current flowing out of the secondary side coil thereof and one using a switching element. Between them, the one using the diode for rectifying a current has a simple circuit configuration, but has the problem of the generation of a rectification loss Vf·I caused by the forward voltage Vf of the diode and the current I flowing through the diode.

Accordingly, there is also a known synchronous rectification type DC-DC converter performing the rectification thereof by replacing the diode with a switching element (e.g. a transistor such as a MOS FET) having a small on-resistance to perform the on-off control of the switching element by synchronous control.

Moreover, an invention for achieving the reduction of power consumption at the time of a light load in an insulated type DC-DC converter was proposed (see, for example, Patent Document 1). The invention stops the operation of the control circuit controlling the switching element on the primary side. The switching loss caused by an on-off operation of a switching element is relatively large at the time of a light load of a switching power supply circuit. The invention of Patent Document 1 attains the further reduction of the power consumption by also stopping the control circuit generating on-off control signals as well as by reducing the switching loss.

Patent Publication 1: Japanese Laid-Open Publication No. 2002-233146

DISCLOSURE OF INVENTION

Problems to Be Solved by the Invention

The invention of Patent Document 1 stopping the control circuit generating the on-off control signals of the switching element on the primary side at the time of a light load has the problem of the delay of the starting of the control circuit when it is desired to restart the control circuit at the time of the falling of the output voltage during the stopping of the control circuit.

Moreover, the synchronous rectification type DC-DC converter performing rectification by the on-off control of the switching element on the secondary side thereof generally obtains the timing of turning on the switching element by detecting a rise of a current flowing through the secondary side coil. It is known that a spike and ringing are caused in the primary side coil at the time of turning off the switching element on the primary side, and the spike and the ringing are transmitted to the secondary side coil to become noise. In order to prevent the switching element on the secondary side from being erroneously turned off by the noise, the control of keeping a signal for turning on the switching element on the secondary side not falling for a predetermined time after the signal has once risen has been performed.

The inventors of the present invention examined the forcible turning-off (fixing to a low level) of a PWM control pulse Vpwm supplied to the switching element on the secondary side by adding a burst mode control circuit composed of a comparator 33 and an AND gate G1 to the circuit (PWM pulse generating circuit) on the primary side, as shown in FIG. 6, in order to attain the reduction of power consumption when a load became light in a synchronous rectification type DC-DC converter performing rectification by the on-off control of the switching element on the secondary side.

The circuit shown in FIG. 6 changes the output Vcomp of the comparator 33 to a low level to close the AND gate G1 and intercepts the PWM control pulse Vpwm when the load of the DC-DC converter becomes light and the feedback voltage VFB from the secondary side thereof becomes higher than a reference voltage Vref1. Thereby, the circuit fixes the output Vout of the AND gate G1 to the low level. Because this circuit does not stop the control circuit at the time of a light load, the circuit can immediately allow the PWM control pulse Vpwm to pass the gate G1 by opening the gate G1 when the on-off control of the switching element on the primary side by the PWM output Vout is desired to be restarted at the time of the lowering of the voltage on the secondary side. Consequently, no delays of the supply of the PWM output Vout are caused.

However, in the burst mode control circuit shown in FIG. 6, the pulse width of the PWM output Vout turning on and off the switching element on the primary side sometimes becomes shorter at the time of a start or an end of a burst mode as shown by marks P1 and P2 in FIG. 7C. Because the rectifying diode is automatically turned off when the current of the secondary side coil becomes small in a diode rectification type DC-DC converter described in Patent Document 1, no backward flows of currents are generated by such decreases of the pulse width.

However, as described above, when a signal for turning on the switching element on the secondary side once rises in the synchronous rectification type DC-DC converter, the signal is controlled so as not to fall for a predetermined time T0, for example, as shown in FIG. 7E. Moreover, the peak value of a current induced in the secondary side coil is in proportion to the pulse width of a PWM control pulse on the primary side, and the peak value becomes smaller as the pulse width becomes narrower. Consequently, it became clear that the synchronous rectification type DC-DC converter had the problem of the flowing of reverse direction currents Ir through the secondary side coil while the switching element on the secondary side was being turned on as shown in FIG. 7F when the pulse width of the primary side PWM output Vout in the burst mode became narrower as denoted by P1 and P2. It can be considered that the circuit may perform a malfunction owing to the reverse direction currents Ir.

The present invention was devised by focusing on the problem mentioned above, and aims to prevent a backward flow of a current on the secondary side in a synchronous rectification type DC-DC converter having a burst mode.

Means for Solving the Problems

In order to attain the object mentioned above, the present invention provides a pulse width ensuring circuit ensuring any pulse width of a control signal for performing on-off control of a switching element connected to a primary side coil not to become equal to or less than an original width of a PWM pulse at a time of entering a bust mode and at a time of exiting the burst mode to a synchronous rectification type DC-DC converter including a voltage converting transformer, the switching element connected to the primary side coil of the transformer, a control circuit for performing on-off control of the switching element, a synchronously rectifying switching element connected to a secondary side coil, and a control circuit performing on-off control of the synchronously rectifying switching element, wherein the DC-DC converter has the burst mode of turning off the control signal of the switching element on the primary side when a load becomes light.

More concretely, a synchronous rectification type switching power supply apparatus, comprises:

a voltage converting transformer;

a first switching element for making a current flow through a primary side coil of the transformer;

a first control circuit for performing on-off control of the first switching element;

a second switching element for performing rectification of a secondary side coil of the transformer; and a second control circuit for performing on-off control of the second switching element, wherein the second control circuit is adapted to ensure a minimum on-period of a signal for turning on and off the second switching element, wherein the first control circuit includes a PWM pulse generating circuit for generating a PWM control pulse to perform the on-off control of the first switching element based on a feedback voltage from a secondary side circuit of the transformer;

a burst mode control circuit for turning off a control signal of the first switching element based on the feedback voltage at a time of a light load; and a pulse width ensuring circuit for ensuring a pulse width of the control signal for performing the on-off control of the first switching element so as not to become equal to or less than an original width of the PWM pulse when entering a burst mode and when exiting the burst mode.

Accordingly, it is possible to prevent performing a malfunction caused by flowing of reverse direction currents through the secondary side coil.

Here, preferably, the burst mode control circuit includes a comparator for comparing the feedback voltage with a reference voltage of a predetermined level, the comparator having a hysteresis characteristic, and a gate unit for allowing or forbidding the PWM control pulse output from the PWM pulse generating circuit to pass through the gate unit according to an output of the comparator, and the pulse width ensuring circuit includes a latch circuit for latching the output of the comparator, wherein the gate unit is controlled by an output of the latch circuit.

Accordingly, it is possible to ensure the pulse width of the PWM control pulse so as not to become equal to or less than a predetermined width of the pulse width and provide a circuit that does not cause bad influence by noise by providing a comparatively simple circuit.

Further, it is preferable to provide the structure that the latch circuit is a D type flip flop receiving any one of the PWM control pulse or a signal synchronized with the PWM control pulse at a clock terminal thereof, and the D type flip flop receives the output of the comparator at a data terminal thereof. Moreover, it is preferable to provide the structure that the PWM pulse generating circuit includes a voltage clamping unit for clamping the feedback voltage, and the switching power supply apparatus is adapted so that the pulse width of the generated PWM control pulse does not become equal to or less than a predetermined width by clamping the feedback voltage with the voltage clamping unit.

Effects of the Invention

As explained above, the present invention provides the effect that it is possible not to flow reverse direction currents through a secondary side coil in a synchronous rectification type DC-DC converter having a burst mode.

BRIEF DESCRIPTION OF THE DRAWINGS

FIG. 6 is a block diagram showing a primary side control circuit of a synchronous rectification type DC-DC converter considered prior to the present invention; and FIGS. 7A-7F are timing charts showing an operation when a load of the control circuit in FIG. 6.

Figure 1:
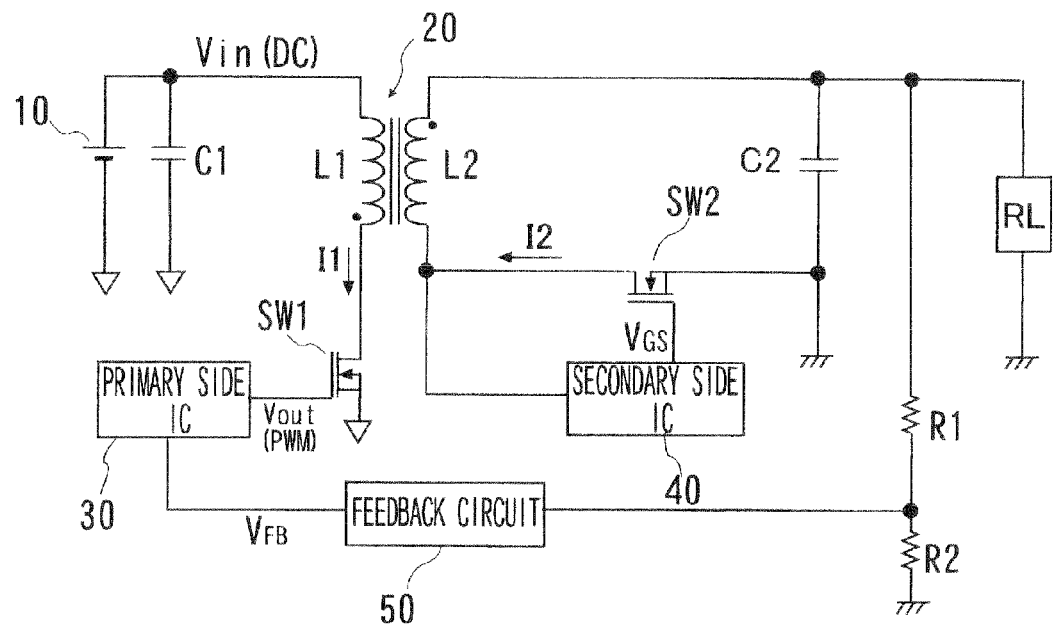
FIG. 1 shows an embodiment of a synchronous rectification type DC-DC converter, to which the present invention is applied.

EXPLANATION OF REFERENCE NUMERAL 10 direct-current power supply
20 transformer
30 primary side control circuit (primary side IC)
31 clock generating circuit
32 PWM pulse generating circuit
33 comparator
40 secondary side control circuit (secondary side IC)
50 feedback circuit
SW1 primary side switch MOSFET
SW2 secondary side switch MOSFET
SWG sawtooth wave generating circuit
PMCP PWM comparator
CLP clamping circuit

BEST MODE FOR CARRYING OUT THE INVENTION

In the following, a preferable embodiment of the present invention will be described with reference to the attached drawings.

FIG. 1 shows an embodiment of a synchronous rectification type DC-DC converter, to which the present invention is applied.

Although the DC-DC converter of the present embodiment is not especially limited as follows, the DC-DC converter includes a direct-current power supply 10, a capacitor C1, and a transformer 20 having a primary side coil L1, to which a direct-current voltage Vin (DC) from the direct-current power supply 10 is input. The other terminal of the primary side coil L1 of the transformer 20 is connected to a ground point through a MOS FET SW1 as a switching element. One terminal of a secondary side coil L2 of the transformer 20 is connected to the ground point through a synchronously rectifying switch MOS FET SW2. Moreover, a smoothing capacitor C2 and series resistors R1 and R2 for detecting a secondary side voltage are connected between the other terminal of the secondary side coil L2 and the ground point. A load RL is connected in parallel to the capacitor C2.

Furthermore, the DC-DC converter of this embodiment includes a primary side controlling semiconductor integrated circuit (hereinafter referred to as a primary side IC or a primary side control circuit) 30 generating a control signal (PWM control pulse) to be supplied to the gate terminal of the switch MOS FET SW1 to perform the on-off control of the switch MOS FET SW1, a secondary side controlling semiconductor integrated circuit (hereinafter referred to as a secondary side IC or a secondary side control circuit) 40 generating a synchronous rectification control signal to be supplied to the gate terminal of the switch MOS FET SW2 to perform the on-off control of the switch MOS FET SW2, and a feedback circuit 50 supplying a voltage divided by the resistance ratio between the series resistors R1 and R2 to the primary side IC 30 as the feedback voltage VFB.

The secondary side IC 40 monitors the terminal voltage of the secondary side coil L2 and generates a control signal VGS to turn on the switch MOS FET SW2 only for the period in which a current flows through the secondary side coil L2 from the ground point toward the smoothing capacitor C2. The secondary side IC 40 applies the generated control signal VGS to the gate terminal of the switch MOS FET SW2. The feedback circuit 50 is composed of an insulating type signal transmitting unit, such as a photo coupler.

Figure 2:
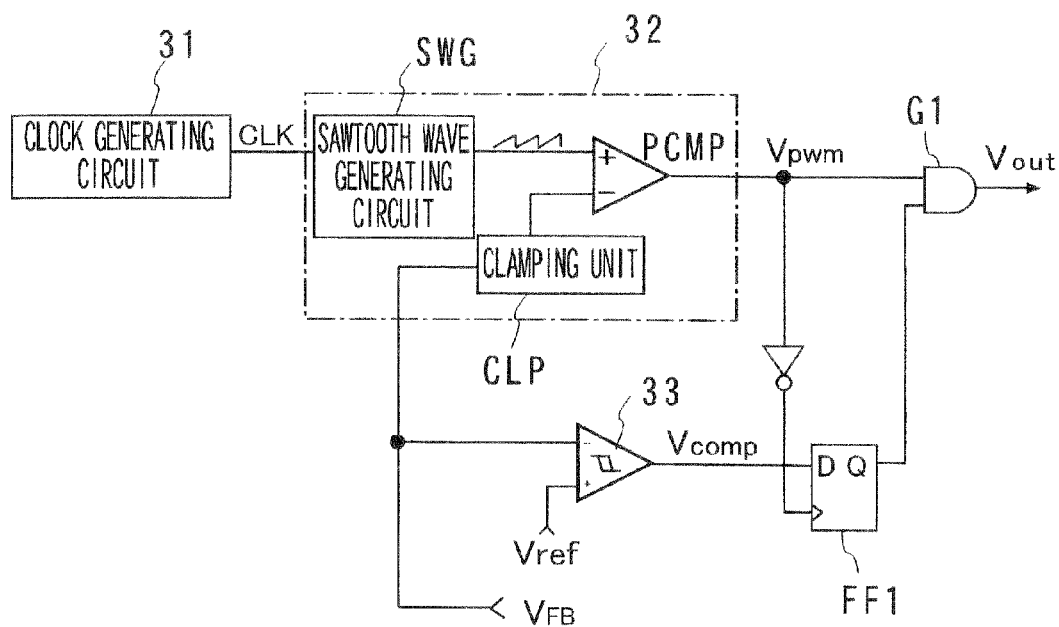
FIG. 2 shows a configuration example of a primary side control circuit in the DC-DC converter of the present embodiment shown in FIG. 1.

FIG. 2 shows a configuration example of the primary side control circuit 30 in the DC-DC converter of the present embodiment.

The primary side control circuit 30 of FIG. 2 includes a clock generating circuit 31 generating a clock signal CLK of a predetermined frequency, and a PWM pulse generating circuit 32 composed of a sawtooth wave generating circuit SWG generating a sawtooth wave (triangular wave) of a predetermined frequency on the basis of the generated clock signal CLK, a PWM comparator PCMP comparing the generated sawtooth wave with the feedback voltage VFB from the feedback circuit 50 to generate a PWM control pulse Vpwm, and the like.

Moreover, the primary side control circuit 30 includes a burst mode control circuit. The burst mode control circuit is composed of a comparator 33, a D type (delay type) flip flop FF1, an AND gate G1, and the like. The comparator 33 receives the inputs of the feedback voltage VFB and a predetermined reference voltage Vref. The D type flip flop FF1 has a clock terminal, to which an output signal, inverted by an inverter, of the PWM pulse generating circuit 32 is input, and a data terminal, to which an output of the comparator 33 is input. The flip flop FF1 takes therein data in synchronization with a rise of the input signal into the clock terminal and holds the data therein. The AND gate G1 receives the inputs of an output of the PWM pulse generating circuit 32 and an output of the flip flop FF1.

The PWM pulse generating circuit 32 is provided with a clamping circuit CLP preventing the feedback voltage VFB from rising to a predetermined value or more to ensure the pulse width of the PWM control pulse Vpwm not to become equal to or less than a predetermined width. When the pulse width of the PWM control pulse Vpwm becomes narrower than a predetermined pulse width of the synchronous rectification control signal VGS, which pulse width is determined by a secondary side inductance value, an output voltage, and the like in the case where the pulse width of the synchronous rectification control signal VGS is ensured in the secondary side control circuit, then it is apprehended that a backward flow Ir flows through the secondary side coil while the switch MOS FET SW2 on the secondary side is being turned on. Accordingly, the clamping circuit CLP is provided for ensuring the pulse width of the PWM control pulse Vpwm so as not to become narrower than the predetermined width also in the primary side control circuit 30. Furthermore, the clamping circuit CLP is sometimes provided also for clamping the feedback voltage VFB so as not to become lower to a predetermined value or less and for ensuring the pulse width of the PWM control pulse Vpwm so as not to become wider than a predetermined width.

Moreover, as the comparator 33, a circuit having a hysteresis characteristic using two voltages Vref1 and Vref2 (Vref1>Vref2) as threshold values is used. By using the circuit having the hysteresis characteristic, it becomes possible to prevent a sensitive response from being caused by the noise added to the feedback voltage VFB.

Figure 3:
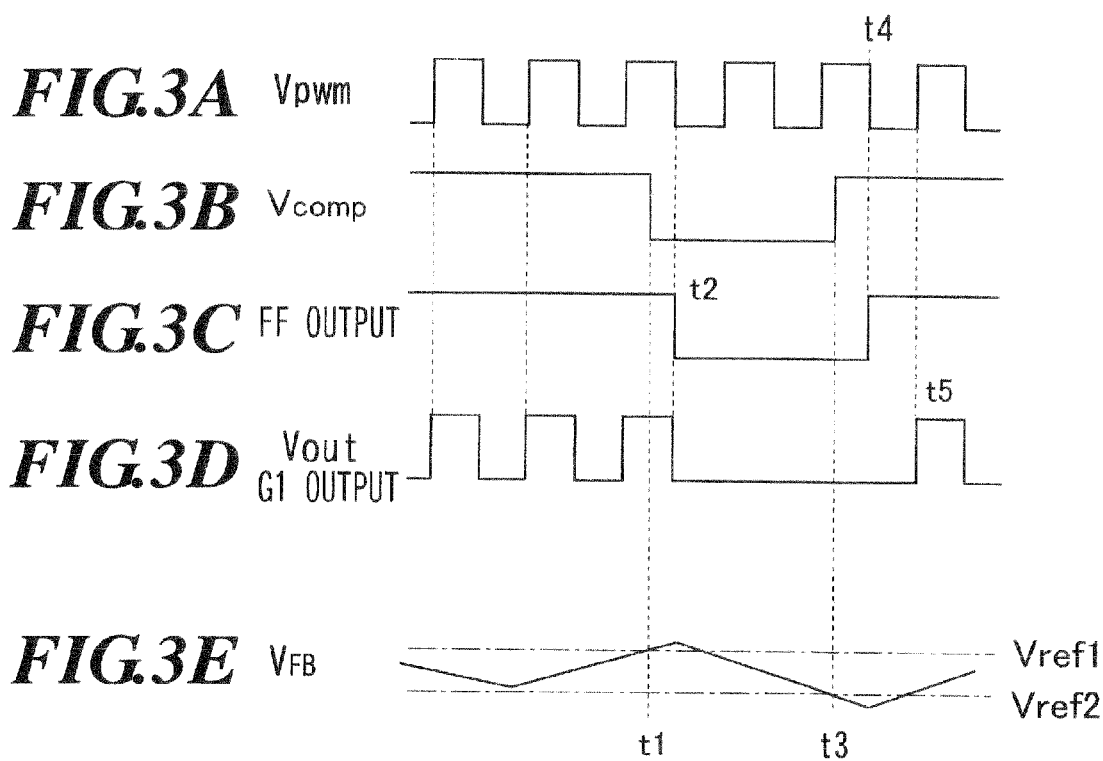
FIGS. 3A-3E are timing charts showing an operation when changing the load of the primary side control circuit shown in FIG. 2.

When the load of the DC-DC converter becomes lighter and the feedback voltage VFB from the secondary side becomes higher than the reference voltage Vref1, the output Vcomp of the comparator 33 changes to the low level (timing t1 in FIG. 3), which is taken in by the flip flop FF1 in synchronization with a fall of the PWM control pulse Vpwm (timing t2) in the primary side control circuit 30 of FIG. 2. Then, when the output of the flip flop FF1 changes to the low level, the control circuit 30 intercepts the PWM control pulse Vpwm by closing the AND gate G1, and thereby the control circuit 30 fixes the gate voltage of the switch MOS FET SW1 to the low level to forcibly change the switch MOS FET SW1 into the off-state.

Moreover, when the feedback voltage VFB from the secondary side lowers to be lower than the reference voltage Vref2 (timing t3), then the output voltage Vcomp of the comparator 33 changes to the high level, which is taken in by the flip flop FF1 in synchronization with a fall of the PWM control pulse Vpwm (timing t4). Then, when the output of the flip flop FF1 changes to the high level, the control circuit 30 opens the AND gate G1 to pass the PWM control pulse Vpwm through the AND gate G1, and consequently the control circuit 30 supplies the PWM control pulse Vpwm to the gate terminal of the primary side switch MOS FET SW1 as a control signal (PWM output) Vout to perform on-off control (timing t5). Because the circuit of this embodiment does not stop the control circuit 30 at the time of a light load, the control circuit 30 does not cause any delay of the supply of the PWM output Vout not to cause the delay of the recovery of the voltage on the secondary side when the voltage on the secondary side lowers and the restart of the on-off control of the primary side MOS FET SW1 is desired.

Furthermore, the pulse width of the PWM output Vout for turning on and off the primary side switching element sometimes become shorter as shown by the marks P1 and P2 in FIG. 7C at the time of a start and an end of a burst mode in the control circuit shown in FIG. 6, which has been examined before the present invention, but the pulse width of the PWM output Vout does not become narrower at the time of a start and an end of a burst mode as shown in FIG. 3D in the control circuit of the present invention shown in FIG. 2. Thereby, it is possible to avoid the occurrence of the situation in which the reverse direction currents Ir flow through the secondary side coil while the switching element (SW2) on the secondary side is being turned on even if the control for not falling the signal for turning on the switching element (SW2) on the secondary side for the predetermined time T0 as shown in FIG. 7E after the signal once rose is performed.

Figure 4:
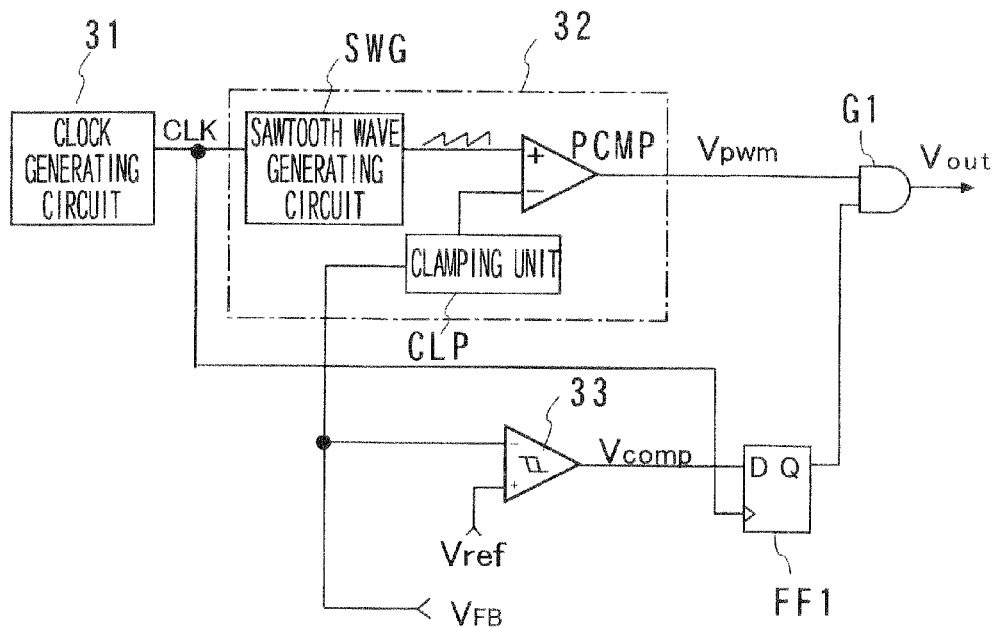
FIG. 4 is a block diagram showing a first modification of the primary side circuit shown in FIG. 2.
Figure 5:
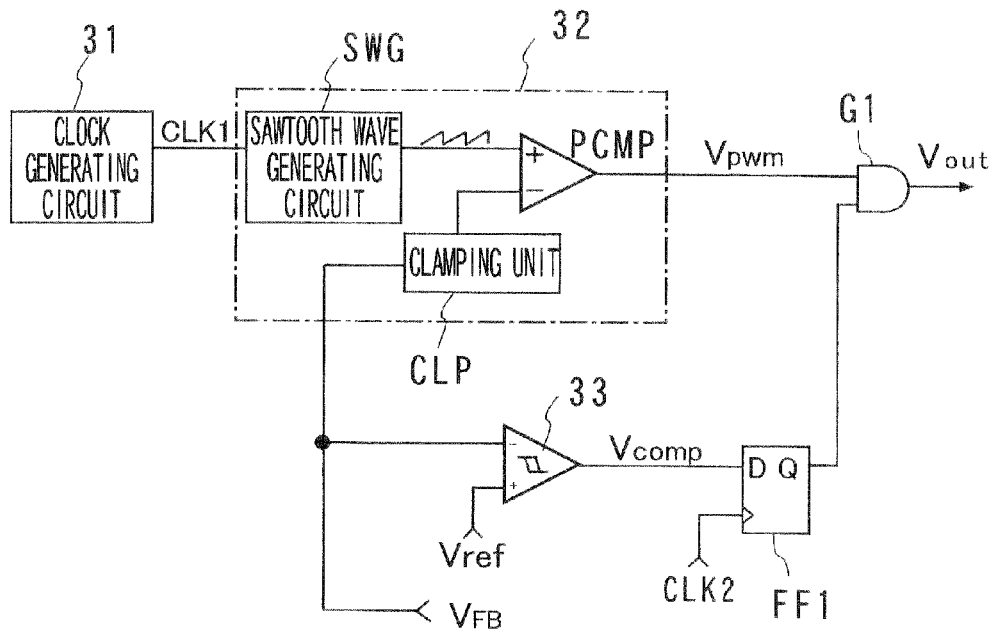
FIG. 5 is a block diagram showing a second modification of the primary side circuit shown in FIG. 2.

FIGS. 4 and 5 show modifications of the DC-DC converter of the embodiment described above. The modification of FIG. 4 between them is the modification giving a latch timing by the use of the clock signal CLK generated in a clock generating circuit 31 as the signal input into the clock terminal of the flip flop FF1 in place of the PWM control pulse Vpwm.

Moreover, the modification of FIG. 5 is the modification using another clock signal CLK2 different from the clock signal CLK1 supplied to the PWM pulse generating circuit 32 as the signal input into the clock terminal of the flip flop FF1 in place of the PWM control pulse Vpwm. The clock signal CLK2 may be one supplied from the outside as long as the clock signal CLK2 synchronizes with the clock signal CLK1.

In the above, one embodiment of the present invention has been described, but the present invention is not limited to the above-mentioned embodiment, and various changes can be performed on the basis of the technical idea of the present invention. For example, although the embodiment applying the present invention to the half-wave synchronous rectification type DC-DC converter including one coil on the secondary side of the transformer 20 has been described, the present invention can be also applied to a full-wave synchronous rectification type DC-DC converter including two coils on the secondary side of the transformer 20 and provided with two switching elements corresponding to the two coils.

Moreover, although the embodiment described above uses the MOS FETs as the switching elements SW1 and SW2, the other kinds of transistors such as a bipolar transistor may be used. Furthermore, although the AND gate G1 controlled by the output of the flip flop FF1 is used as the output circuit of the primary side control circuit, the other kinds of logical gates, such as a NOR gate, and a transmission gate made of a MOS FET may be used.

INDUSTRIAL APPLICABILITY

Although an example of applying the present invention to a DC-DC converter has been described in the above description, the present invention is not limited to the example, and the present invention can be also used for an AC-DC converter provided with a rectification circuit composed of a diode bridge circuit at the preceding stage of the primary side circuit of FIG. 1 to be adapted so that a direct-current voltage obtained by the rectification of an alternating voltage may be input into the primary side coil. The present invention can be widely used for a switching power supply apparatus including switching elements connected to the primary side coil and the secondary side coil.

The invention claimed is:

1. A synchronous rectification type switching power supply apparatus, comprising:
    a voltage converting transformer;
    a first switching element for making a current flow through a primary side coil of the transformer;
    a first control circuit for performing on-off control of the first switching element;
    a second switching element for performing rectification of a secondary side coil of the transformer; and
    a second control circuit for performing on-off control of the second switching element, wherein the second control circuit is adapted to ensure a minimum on-period of a signal for turning on and off the second switching element, wherein
    the first control circuit includes
        a PWM pulse generating circuit for generating a PWM control pulse to perform the on-off control of the first switching element based on a feedback voltage from a secondary side circuit of the transformer;
        a burst mode control circuit for turning off a control signal of the first switching element based on the feedback voltage at a time of a light load; and
        a pulse width ensuring circuit for ensuring a pulse width of the control signal for performing the on-off control of the first switching element so as not to become equal to or less than an original width of the PWM pulse when entering a burst mode and when exiting the burst mode.

2. The switching power supply apparatus according to claim 1, wherein
    the burst mode control circuit includes a comparator for comparing the feedback voltage with a reference voltage of a predetermined level, the comparator having a hysteresis characteristic, and a gate unit for allowing or forbidding the PWM control pulse output from the PWM pulse generating circuit to pass through the gate unit according to an output of the comparator, and
    the pulse width ensuring circuit includes a latch circuit for latching the output of the comparator, wherein
    the gate unit is controlled by an output of the latch circuit.

3. The switching power supply apparatus according to claim 2, wherein the latch circuit is a D type flip flop receiving any one of the PWM control pulse or a signal synchronized with the PWM control pulse at a clock terminal thereof, and the D type flip flop receives the output of the comparator at a data terminal thereof.

4. The switching power supply apparatus according to claim 1, wherein the PWM pulse generating circuit includes a voltage clamping unit for clamping the feedback voltage, and the switching power supply apparatus is adapted so that the pulse width of the generated PWM control pulse does not become equal to or less than a predetermined width by clamping the feedback voltage with the voltage clamping unit.

5. A primary side control circuit of a switching power supply apparatus constituting a synchronous rectification type switching power supply apparatus for making a current intermittently flow through a primary side coil of a transformer with a first switching element, the apparatus rectifying a current thereby induced in a secondary side coil of the transformer by on-off control of a second switching element to generate a secondary side voltage, the control circuit comprising:
    a PWM pulse generating circuit for generating a PWM control pulse for performing on-off control of the first switching element based on a feedback voltage from a secondary side circuit of the transformer;
    a burst mode control circuit for turning off a control signal of the first switching element based on the feedback voltage at a time of a light load; and
    a pulse width ensuring circuit for ensuring a pulse width of the control signal for performing the on-off control of the first switching element so as not to become equal to or less than an original width of the PWM pulse when entering a burst mode and when exiting the burst mode.

6. The primary side control circuit of the switching power supply apparatus according to claim 5, wherein
the burst mode control circuit includes a comparator for comparing the feedback voltage with a reference voltage of a predetermined level, the comparator having a hysteresis characteristic, and a gate unit for allowing or forbidding the PWM control pulse output from the PWM pulse generating circuit to pass through the gate unit according to an output of the comparator, and
the pulse width ensuring circuit includes a latch circuit for latching the output of the comparator, wherein
the gate unit is controlled by an output of the latch circuit.

7. The primary side control circuit of the switching power supply apparatus according to claim 6, wherein the latch circuit is a D type flip flop receiving any one of the PWM control pulse and a signal synchronized with the PWM control pulse at a clock terminal thereof, and the D type flip flop receives the output of the comparator at a data terminal thereof.

8. The primary side control circuit of the switching power supply apparatus according to claim 5, wherein the PWM pulse generating circuit includes a voltage clamping unit for clamping the feedback voltage, and the primary side control circuit is adapted so that the pulse width of the generated PWM control pulse does not become equal to or less than a predetermined width by clamping the feedback voltage with the voltage clamping unit.

* * * * *